UNITED STATES PATENT OFFICE.

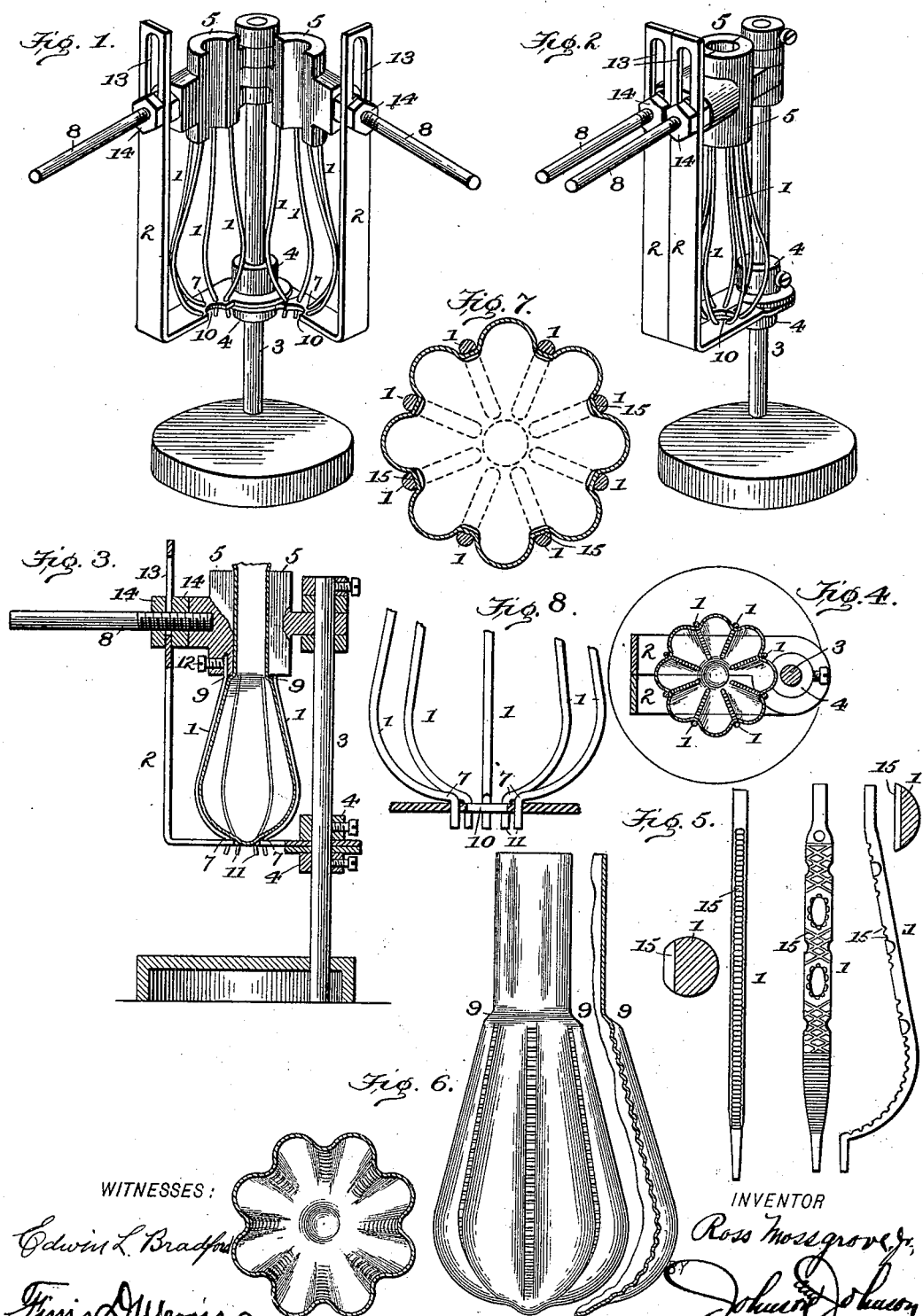

ROSS MOSSGROVE, JR., OF STEUBENVILLE, OHIO, ASSIGNOR OF ONE-HALF TO EMMETT McD. McKEE, OF SAME PLACE.

INCANDESCENT-ELECTRIC-LIGHT BULB.

SPECIFICATION forming part of Letters Patent No. 632,058, dated August 29, 1899.

Application filed November 26, 1898. Serial No. 697,547. (No model.)

*To all whom it may concern:*

Be it known that I, ROSS MOSSGROVE, Jr., a citizen of the United States, residing at Steubenville, in the county of Jefferson and State of Ohio, have invented a new and useful Improvement in Corrugated Incandescent-Electric-Light Bulbs and in Methods of Producing the Same, of which the following is a specification.

The invention herein is directed to the manufacture of blown corrugated bulbs for incandescent electric lamps; and the purpose of my invention is the production of such articles complete in an open skeleton metal matrix in such manner as to preserve the natural brilliancy of blown glass to obtain the fullest light capacity and a beautiful effect in the light-rays.

It is well known in the art that glass articles blown in solid metal molds are to a great extent deprived of the natural brilliancy and vitreous polish of the glass, because, among other reasons, the contact of the hot glass with the solid metal molding-walls produces effects which destroy the vitreous polish and clearness of the glass, and thereby causes diminution of the light emitted, nor is the dull and partially-clouded effect produced by a solid mold on blown glass prevented by the well-known pasting of the metal surface, because to obtain a polishing result from such pasting the article being molded or the mold must be rotated in the process of blowing and forming. Blown-glass articles having corrugated walls cannot be rotated while being molded.

In producing the bulb by my improved method the natural vitreous polish of the glass is preserved, giving a better refractive disposition of the light-rays and a greater volume of light. To this end my new blown bulb is produced in a mold the walls of which are formed of curved rods or bars with openings between them and forming a skeleton closure the exact contour of the curved walls and curved bottom of the bulb and forming and shaping the corrugations thereof. In forming this skeleton closure the matrix-rods terminate in curved ends and form a circle by which the corrugations are caused to terminate in the bottom of the bulb. In this process the rods form the only solid parts of the matrix and support the glass against the internal pressure of the blowing force and cause the swell parts of the glass to take the exact curved forms of the curved rods in forming the longitudinal outline of the corrugations. In this action the matrix-rods have the effect by their curved form of drawing and guiding the glass so as to cause it to follow their curves, and thereby determine the contour of the bulb and of its longitudinal corrugations. In this process the valley or concave surface parts only have contact with the matrix-forming rods or bars, and such contact-surfaces I form so as to enhance the natural vitreous polish and brilliancy of the glass. To effect this increased brilliancy of these surface parts and cause them to produce rays of sparkling light, I form these valley surface parts with one or more lines or ridges of projections of prismatic or other forms in the deepest part thereof, so that they will practically stand transversely in relation to the longitudinal projecting corrugations, and thereby give the valleys a capacity for refracting light in sparkling rays. This effect is aided by the relation of the valley projections to the unbroken surfaces of the longitudinal corrugations, the natural brilliancy of which will coöperate to fully develop the prismatic effect of the valley transverse corrugations under the incandescent filament. Moreover, the valley corrugations serve to prevent the glass from sticking to the metal walls. The bulb blown and shaped in this way in a skeleton closure in complete form is of uniform thickness and has the same interior and exterior surface conformation.

For the purpose of informing those skilled in the art to which my invention appertains of the nature of my said invention and for the purpose of instructing them how the same may be advantageously employed I have shown one form of a skeleton matrix-closure whereby my new glass bulb may be produced in the form which I prefer to employ it, and in such illustration I have also shown the article produced by said skeleton matrix.

Referring to these illustrations, Figure 1 represents in perspective my skeleton-formed matrix or molding-closure with its divided parts open to permit the proper placing of the gather on the end of the blowpipe preparatory to blowing the bulb in the closed matrix. Fig. 2 is a like view showing the matrix closed as when the bulb is being blown. Fig. 3 is a vertical section of the same, the bulb being shown as having been blown. Fig. 4 is a horizontal transverse section, taken at the matrix-forming rods, showing the bulb corrugations as formed by the rods. Fig. 5 shows two forms of the matrix-forming rods, and Fig. 6 shows in side view and in longitudinal and cross section the glass bulb as formed by my process in a skeleton matrix-closure and illustrating the longitudinal and valley corrugations. Fig. 7 shows an enlarged cross-section of the skeleton matrix-forming closure; and Fig. 8 is a vertical section, enlarged, of the bottom-forming part of the mold.

The mold or matrix is constructed of two half parts, each of which has matrix-forming rods or bars 1 disposed in each part to form a semicircle in cross-section, with openings between the rods having a width and longitudinal form corresponding to the corrugations which are formed by blowing the glass in swells between the rods. In their closed relation these semicircularly-disposed rods form the molding-closure. Each half-mold part is separately supported in a hanger 2, of angle-iron, which is separately mounted upon a suitable stud or post 3, whereon the matrix-forming parts are adapted to be opened and closed as an overhanging mold. The hangers are bars, preferably of L shape, the lower horizontal arm of which is fitted to swing on collars or retainers 4 on the post, so that when these arm parts are joined at their edges they will be on the same plane. In these arm parts the lower ends of the matrix-forming rods are fitted, preferably by holes in the hanger-arms, while at their upper ends said rods are fitted, preferably by holes, in the lower ends of vertically-divided tubular parts 5, which form the neck of the blown bulb and are retained by collars 6 on the post. Each of these tubular parts is mounted to swing freely on the post, so that when closed they form a tube centrally with the circle formed by the lower ends 7 of the matrix-forming rods.

The hangers by their vertical arms are each connected to a handle of each divided tubular neck part, so that each hanger and its tubular top part form a housing for the skeleton-matrix-forming-closure half parts. At their neck connection the rods stand back a little from the tubular walls, so as to form the shoulder on the bulb at its junction with the neck. While starting from the lower end of the neck part, the rods swell outward and terminate in under curves at their junction with the hanger horizontal arms, so as to leave a portion of their surface between the ends of the rods and a semicircular recess 10 at the meeting edges of said arms, so that when the latter are closed these edge recesses will form an opening centrally with the neck-forming parts, as in Figs. 1, 2, and 8. This bottom circular opening and the rods terminating with a slight convex formation around the opening, as seen in Figs. 3 and 8, serve to give the proper symmetrical conformation to the closed end of the bulb and to the corrugations terminating therein. I prefer to construct the rods with straight ends 11, as in Figs. 3 and 11, so as to easily fit them or to change them for rods of other forms or of different lengths where it is desired to change the form or contour of the bulb and the design of its corrugations—as, for instance, to produce the corrugations in oblique designs and bulbs of different lengths—but of whatever form they are freely engaged with their retaining parts so as to render them interchangeable in their housing as matrix-forming parts having the contour and design of the bulb to be thereby produced.

As shown, the matrix-forming rods or bars are disposed four in each half of the matrix, and they are of a size in cross-section to give the proper width to the valley or concave corrugations in the bulb; but they may be varied in number and in their contour and form of their cross-section, the essential matter being a molding-closure of two equal parts, each part formed of curved rods and intervening openings surmounted by a solid semitubular part and seated in an arm part, each closure-forming part being free to be opened and closed upon a support, the rods having the function to guide and to control the glass within their intervening openings in the production of the complete and finished bulb.

As the matrix-forming rods have the contour to give the curved swell form to the walls of the bulb, they must be retained in their proper relation to each other to maintain their symmetrical contour, which would be destroyed if the rods were not held from turning on their ends, and for this purpose I make their ends of angular form in cross-section and fit them into corresponding sockets or holes in their retaining parts, or the rods may be clamped by screws 12 in the neck-forming parts, as in Fig. 3.

While I have made provision for interchanging the matrix-forming rods for producing different designs of bulbs, the construction also provides for the adjustment of the matrix-housing for the manufacture of bulbs of different lengths. This provision consists in adjusting up or down the housing angle-bars on their post-support, so as to lessen or to increase the distance between the bottom angle-arms and the neck-forming parts, and thereby admit of the use of longer or shorter matrix-forming rods in the same hanger-parts. The means for making this adjustment may be by the collars between which the housing angle-arms are confined on the post, said collars being clamped at the proper adjustment by screws, as in Fig. 3. In making this adjustment the upper ends of the angle housing-arms, by means of slots 13, are free to move on the handles of the neck-forming parts and to which the said housing-arms are clamped by nuts 14 on threaded parts of the handles. It will be understood that in adjusting the housing angle-arm parts they will be caused to move together on the post so as to preserve their proper relation as seats for the matrix-forming rods.

An important feature of my improvement is the provision on the matrix-forming sides of the curved rods, on corrugations, projections, or scallops 15, Fig. 5, so that while the rods serve as guides to direct and control the moving glass over and into the openings between them they serve the further function of producing in the valleys of the bulb-walls corrugations which produce identical prismatic or other forms of projections in lines along the deepest outer surface part of the valleys which give out sparkling light-rays, increase the volume and brilliancy of the refracted light, and prevent the tendency of the glass to stick to the rods. I have shown two designs of these rod corrugations, and they may be varied in one or more lines on each rod.

In working with the mold a boy sits at the handled side to open and to close its hinged half parts. In its open position the blower, having collected on the end of the blowpipe a gather of plastic glass and rolled it on a forming-block, places it in the upper open end of the tubular neck, and the mold being then closed he blows the glass into form against the rods, which in their guiding and controlling function cause it to be forced between them and along their curves, conforming to the contour of the body and of the closed end of the bulb. The bulb having been thus formed complete, the mold is opened, the bulb is removed and broken at the neck from the blowpipe. In this way the complete bulbs are produced rapidly and with the advantage of a better light-refracting capacity than is possible with a solid metal mold.

There is an important action of the rods in causing the glass to swell out so that the corrugations will extend beyond the circumference of the circle formed by the rods to give full formation to the valleys in the walls of the bulb, and this result is due to the fact that the rods offer no flat surface between them for contact with the expanding glass, the sides of the rods retreating from the walls of the longitudinal corrugations, as in Figs. 4 and 7.

The state of the art shows that incandescent-electric-light bulbs having longitudinal corrugations have been produced by blowing in a solid mold the inner walls of which have a conformation producing and corresponding with the corrugations of the bulb. It also shows that it is not new to form bottles with cylindrical corrugated walls in a mold having its inner circumferential outline formed of circularly-arranged edgewise-disposed blades or plates comparatively thin and many times greater in width than in thickness and in which the matrix-forming edges are at all points equidistant from the axis of the mold and form intervening openings into which the glass is blown to form the corrugations on the walls of the bottle; but so far as I know and can find corrugated bulbs for incandescent electric lamps have not prior to my invention been produced complete on a blowpipe in a skeleton matrix-closure formed by rods having the contour of the bulb and by their curved forms guiding and controlling the glass over and between the rods to form the walls and bottom of the bulb, nor a bulb in which the valleys of the corrugations are formed with transverse corrugations to increase the volume of the emitted light in the way stated.

I do not claim herein the described and illustrated invention of the skeleton matrix-forming closure, since I have made the same the subject of a separate application for a patent filed of even date herewith.

I claim as my improvement—

1. As a new manufacture, a blown molded glass bulb for incandescent-electric-light lamps produced complete with longitudinal corrugated walls having the natural vitreous polish and brilliancy of the glass.

2. As a new manufacture, a blown molded glass bulb for incandescent-electric-light lamps produced complete with longitudinal corrugated walls having the natural vitreous polish and brilliancy of the glass and having its surface valleys between the corrugations formed with transverse corrugations or line or projections.

In testimony whereof I have hereunto signed this specification, at Washington, District of Columbia, this 8th day of November, 1898.

ROSS MOSSGROVE, JR.

Witnesses:
A. ROLAND JOHNSON,
GUY H. JOHNSON.